US006231113B1

(12) United States Patent
Armbruster et al.

(10) Patent No.: US 6,231,113 B1
(45) Date of Patent: May 15, 2001

(54) CABLE DRIVE FOR MOTOR-VEHICLE SLIDING DOOR

(75) Inventors: Stefan Armbruster, Heiligenhaus; Kornelia Greulich, Essen, both of (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 09/282,702

(22) Filed: Mar. 31, 1999

(30) Foreign Application Priority Data

Apr. 30, 1998 (DE) .............................................. 198 19 421

(51) Int. Cl.7 ................................ B60J 5/06; E05F 11/54; F16D 13/36

(52) U.S. Cl. .......................... 296/155; 49/360; 192/89.21

(58) Field of Search .............................. 296/155; 49/360, 49/340; 192/89.21, 96, 97

(56) References Cited

U.S. PATENT DOCUMENTS 3,580,372 * 5/1971 Schiefer et al. ..................... 192/105
4,776,443 * 10/1988 Maruyamano et al. .......... 192/70.12
4,932,715 * 6/1990 Kramer ................................ 296/155
5,448,856 * 9/1995 Moore et al. .......................... 49/340
5,634,296 * 6/1997 Hebda .................................... 49/345
5,737,875 4/1998 Dowling .
5,746,025 * 5/1998 Shimura ................................. 49/362
5,913,563 * 6/1999 Watanabe et al. ................... 296/155

FOREIGN PATENT DOCUMENTS 3827859 2/1990 (DE) .

* cited by examiner

*Primary Examiner*—D. Glenn Dayoan
*Assistant Examiner*—Greg Blankenship
(74) *Attorney, Agent, or Firm*—Herbert Dubno; Andrew Wilford

(57) ABSTRACT

A cable drive for a motor vehicle having a body and a door slidable outside the body has a rotatable shaft projecting through the body and having an outer end outside the vehicle adjacent the door and an inside end inside the vehicle. A drum outside the vehicle is mounted on the outside end and a cable wholly outside the vehicle is wound around the drum and connected to the door so that rotation of the drum and shaft in one direction slides the door into a closed position and opposite movement slides it into an open position. A motor unit wholly inside the vehicle is connected to the inside shaft end to rotate the shaft.

4 Claims, 7 Drawing Sheets

CABLE DRIVE FOR MOTOR-VEHICLE SLIDING DOOR

FIELD OF THE INVENTION

The present invention relates to a motor-vehicle sliding door such as used on a van or minivan. More particularly this invention concerns a cable drive for such a door.

BACKGROUND OF THE INVENTION

A standard motor-vehicle sliding door moves on tracks between a closed position and an open position. It is now standard to provide a drive for power-assisted and even remote operation of this door, which under the best of circumstances can be difficult to manipulate. Thus in a standard arrangement a pair of cable sections, which may be separate or parts of a common cable, each have one end anchored on the door and an opposite end anchored on a drum or respective coaxial sections of a drum. A drive gear rotated by a reversible electrical motor rotates the drum, depending on whether the door is to be opened or closed, paying out one of the cables and winding up the other cable.

In a standard arrangement as described in U.S. Pat. No. 5,046,283 of Compeau the drive motor and drum are mounted inside the vehicle and the cables are deflected about a fairly complex path from their attachment point on the door outside the vehicle to the interior drive unit. Such an arrangement is rather complex and, due to the numerous deflecting rollers over which the cables must pass, prone to failure at several high-stress locations. In addition installing the door, threading the cable into position, and generally getting the slider working is a substantial amount of work during the manufacturing process.

Another problem with these systems is that if the drive fails the door can be almost impossible to open. German utility model 296 13 848 describes an emergency-override system for a sunroof that requires a special tool that is inserted into the drive mechanism in order to operate it manually and/or override the motor drive. Such a system is extremely inconvenient and is basically only intended for use by equipped service personnel; it is not suitable for the end user to use in the field for an emergency exit from the vehicle.

OBJECTS OF THE INVENTION

It is therefore an object of the present invention to provide an improved cable drive for a motor-vehicle sliding door.

Another object is the provision of such an improved cable drive for a motor-vehicle sliding door which overcomes the above-given disadvantages, that is which is of simple construction so it is inexpensive to install and has a long service life.

A further object is to provide such a cable drive which has a simple and easy-to-use override by means of which the door can be opened manually without the use of tools.

SUMMARY OF THE INVENTION

A cable drive for a motor vehicle having a body and a door slidable outside the body has according to the invention a rotatable shaft projecting through the body and having an outer end outside the vehicle adjacent the door and an inside end inside the vehicle. A drum outside the vehicle is mounted on the outside end and a cable wholly outside the vehicle is wound around the drum and connected to the door so that rotation of the drum and shaft in one direction slides the door into a closed position and opposite movement slides it into an open position. A motor unit wholly inside the vehicle is connected to the inside shaft end to rotate the shaft.

With the instant invention the entire cable is outside the vehicle along with the drum so the various rollers and such which guide the cable need only follow a relatively simple path. The drive unit can be a wholly separate subassembly that is easily mounted inside the vehicle, out of harm's way, greatly facilitating manufacture of the vehicle.

According to the invention a clutch is provided between the motor unit and the shaft openable to uncouple the motor unit from the shaft and closable to connect the motor unit to the shaft. This clutch has an input clutch member directly driven by the motor, rotatable on the shaft, and having a clutch surface and an output clutch member fixed rotatably on the shaft and having a clutch surface engageable axially with the surface of the input clutch member. A spring operatively braced between the clutch members urges the surfaces thereof axially together so that when the surfaces are engaged together the shaft is coupled via the clutch members to the motor unit. A fixed nut adjacent one of the clutch members carries a spindle that is engageable with the one clutch member to push it against the spring out of engagement with the other clutch member. A manually operable handle on the spindle allows it to be screwed in and out to engage and disengage the clutch.

The shaft according to the invention carries a disk and the spring is braced between the disk and the output clutch member. In addition the surfaces are frustoconical and centered on the axis. The handle itself is a radially projecting arm movable against or between stops defining end positions for it. Thus with a motor-driven door all that is necessary for manual operation is to uncouple it from the drive unit, so that the door can be slid manually in its tracks. What is more the clutch according to the invention can be overpowered, for prying-open of the door in an emergency.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
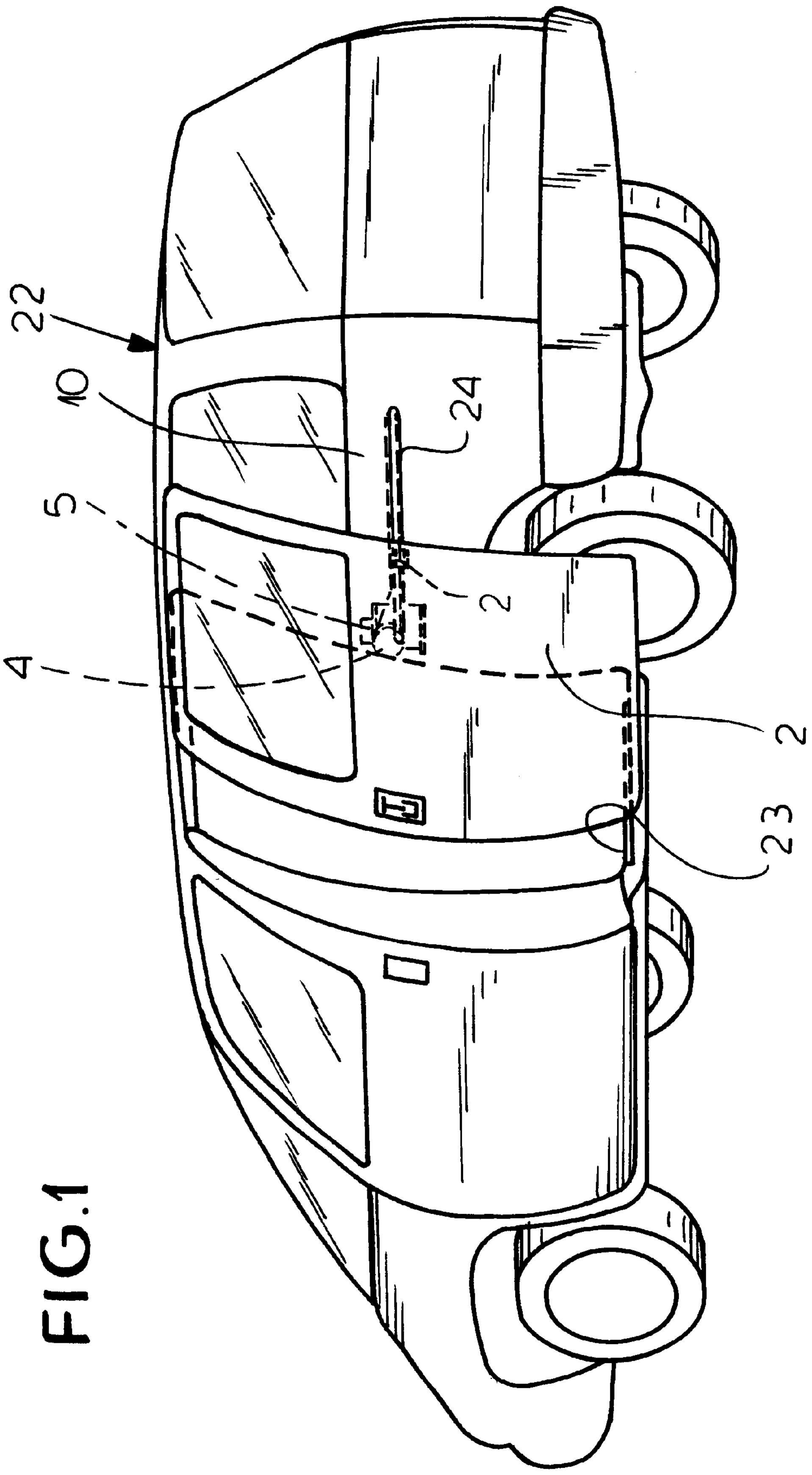
FIG. 1 is a small-scale perspective view of a minivan equipped with the sliding door according to the invention.
Figure 2:
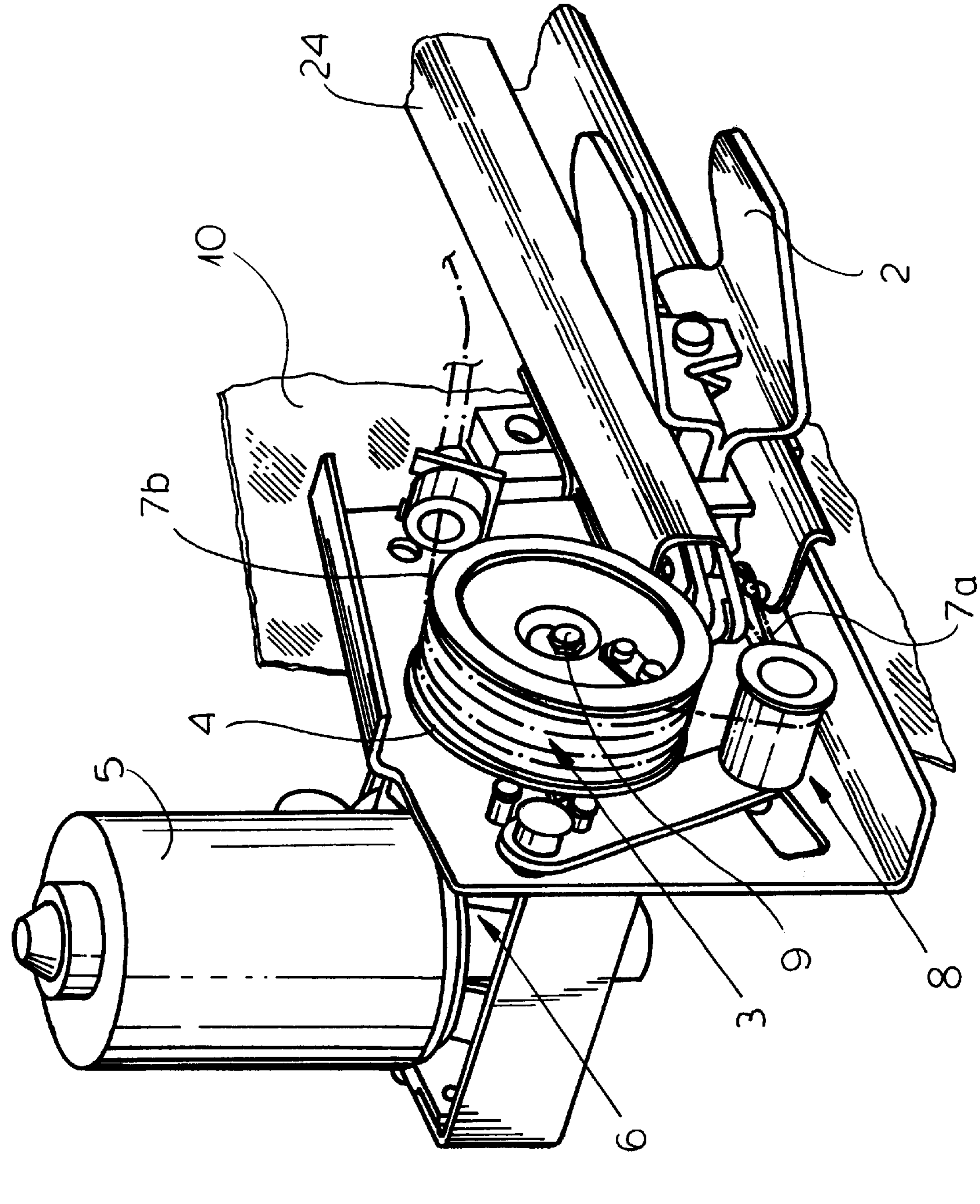
FIGS. 2 and 3 are front and rear perspective views of the drive unit of the sliding door.
Figure 3:
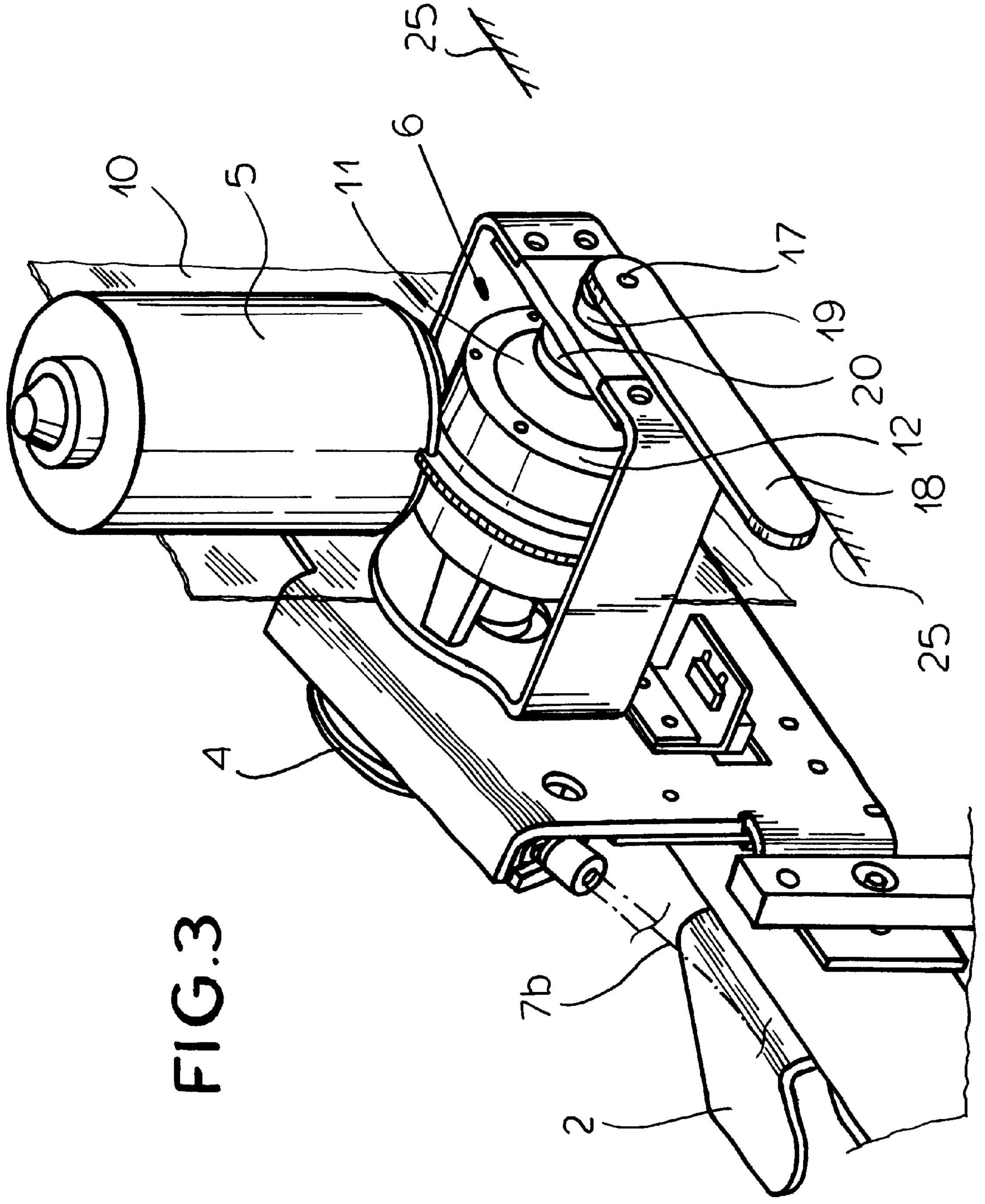
Figure 7:
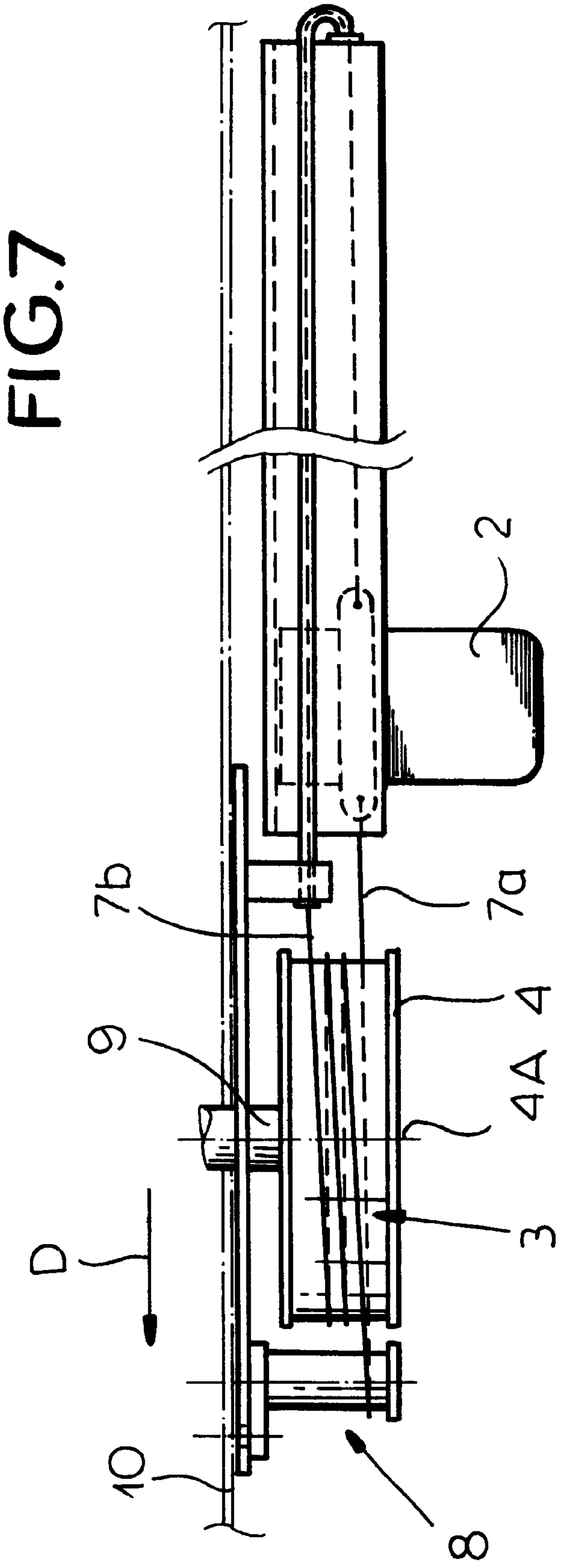
FIG. 7 is a top view of the cable drive.

As seen in FIGS. 1 and 7 a motor vehicle 22 has a side sliding door 1 movable in upper and lower tracks 23 (only one shown) and provided with a central arm 2 that projects inward into a slot 24 formed in the vehicle body 10. A first cable 7*a* has one end connected to the arm 2, an opposite end wound around a drum 4 located outside the body 10, and a central portion engaged around a front deflecting roller 8, and a second cable 7*b*, which can be unitary with the cable 7*a*, has one end connected to the arm 2, an opposite end also wound around the drum 4, and a central portion engaged around a rear unillustrated deflecting roller like the roller 8.

The drum 4 may be split into two parts each receiving a respective one of the cables 7*a* and 7*b* and urged angularly apart by a spring as described in commonly owned patent application 09/071,405 filed May 1, 1998 (now U.S. Pat. No. 5,992,919 issued Nov. 30, 1999). As the drum 4 is rotated in one sense about its horizontal axis 4A extending perpendicular to the motor-vehicle travel direction D, the door 1 will be moved forward in this direction D and when oppositely rotated it will move back.

While the drum 4 is wholly outside the vehicle body 10 and is mounted in line with the cables 7*a* and 7*b* so that they have to pass around a minimal number of deflecting rollers 8, a motor/transmission unit 5 and clutch 6 that serve to rotate this drum 4 are both mounted wholly inside the vehicle body 10. Only a shaft 9 extends along the axis 4A from the clutch 6 inside the vehicle body 10 to the drum 4 outside the body 10.

More particularly this clutch 6 includes an input gear 21 mounted rotatably on the shaft 9 and driven by a worm gear of the motor unit 5. It is fixed to a cup-shaped wheel 12 meeting a wheel 11 fixed on the shaft 9 at frustoconical surfaces 16 centered on the axis 4A. A spring 14 biased between a support disk 13 fixed on the shaft 9 and the wheel 11 normally urges the wheel 11 into tight engagement at the surfaces 16 with the wheel 13, thereby rotationally coupling the input gear 21 to the shaft 9. The disk 13 is cup-shaped and the wheel 11 has a skirt 15 overlapping the disk 13 to contain and protect the springs 14. Thus under normal circumstances the clutch 6 is closed with the motor 5 driving the drum 4 in either direction. The frictional engagement at the surfaces 16 is normally enough to move the door 1 under any circumstances, but in an emergency it is possible to, for instance, pry open the door 1 and move it with slippage at the surfaces 16.

Figure 4:
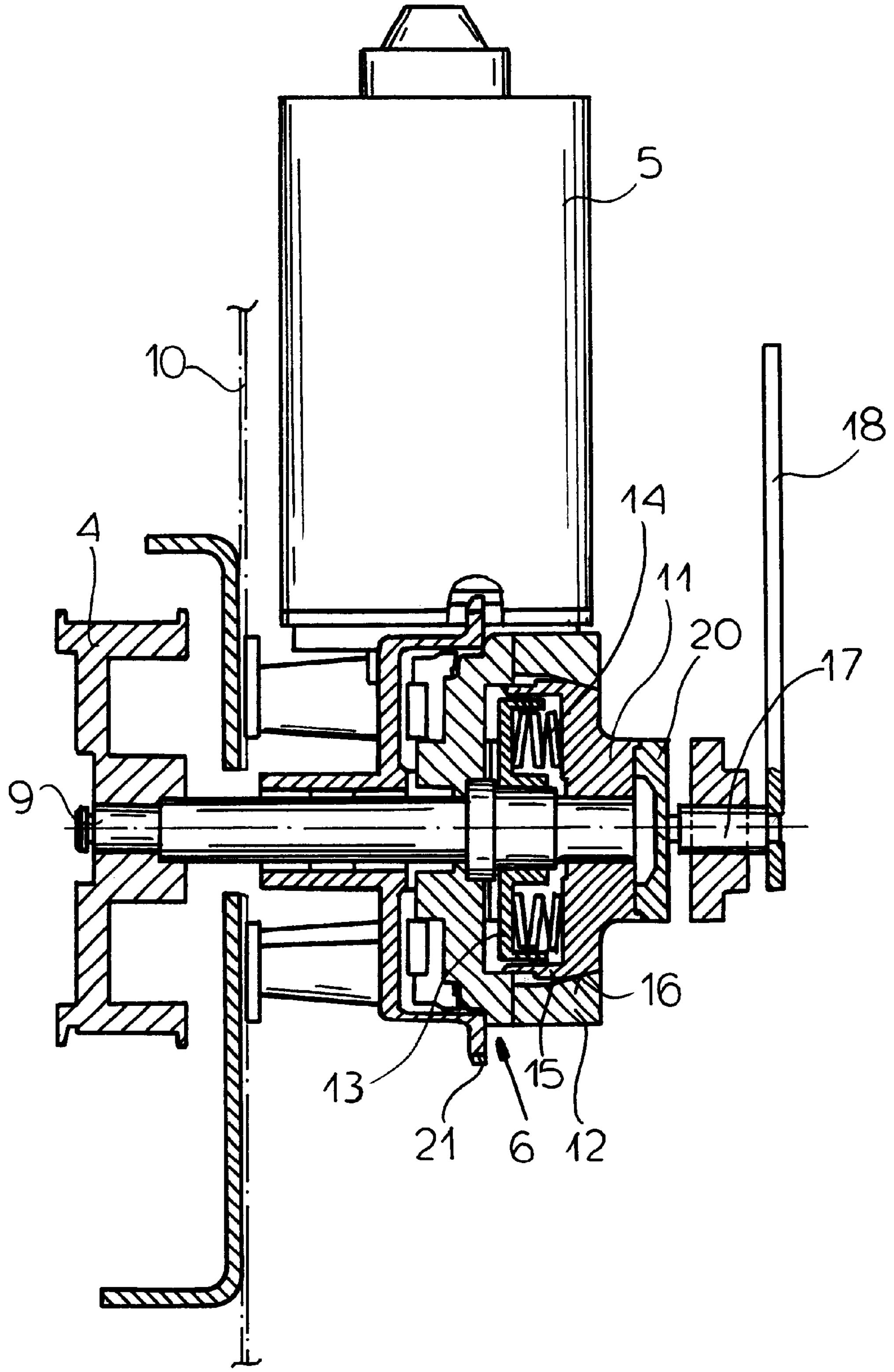
FIGS. 4 and 5 are vertical sections through the drive in accordance with the invention in the motor-drive position and the manual-override position, respectively.
Figure 5:
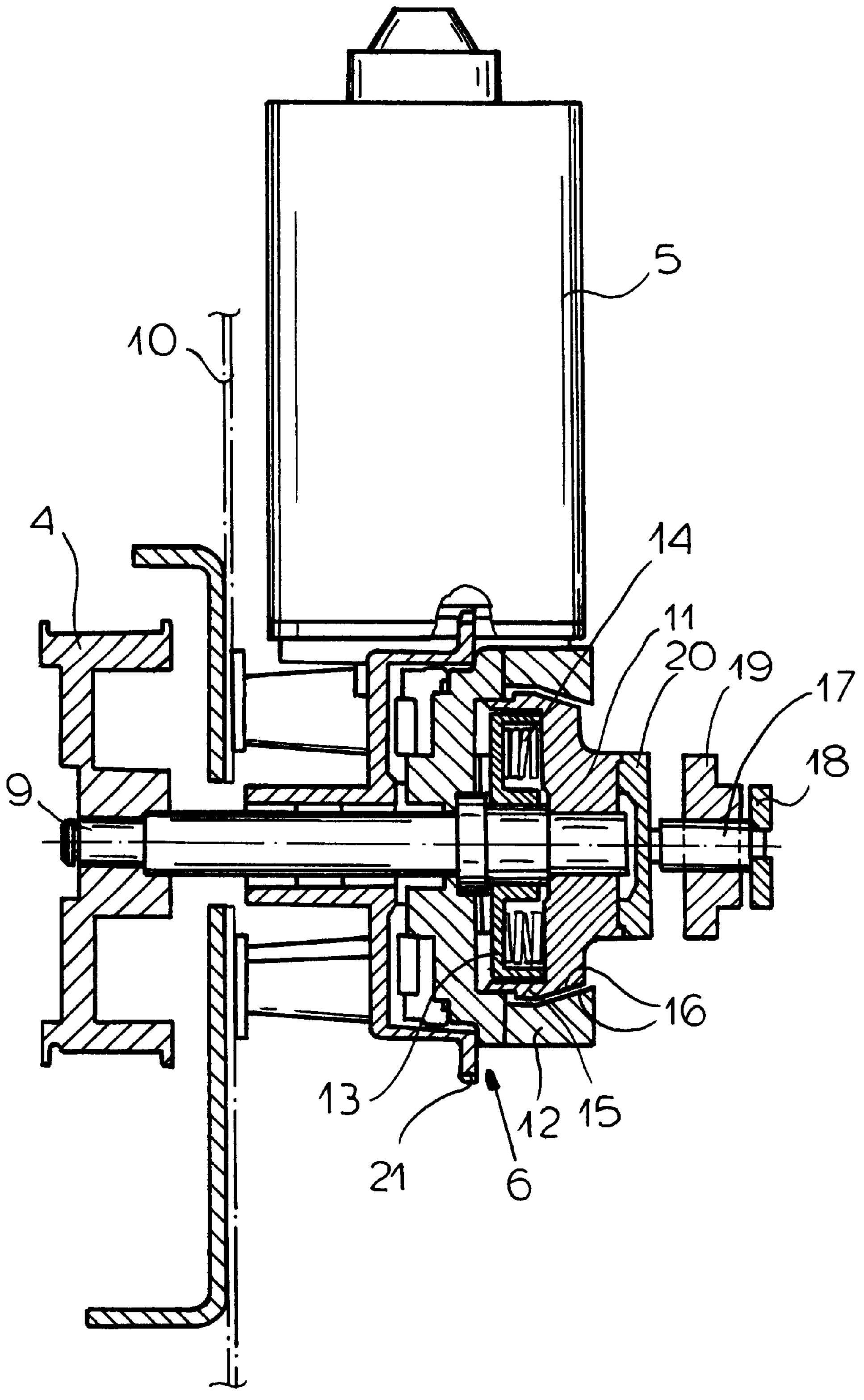
Figure 6:
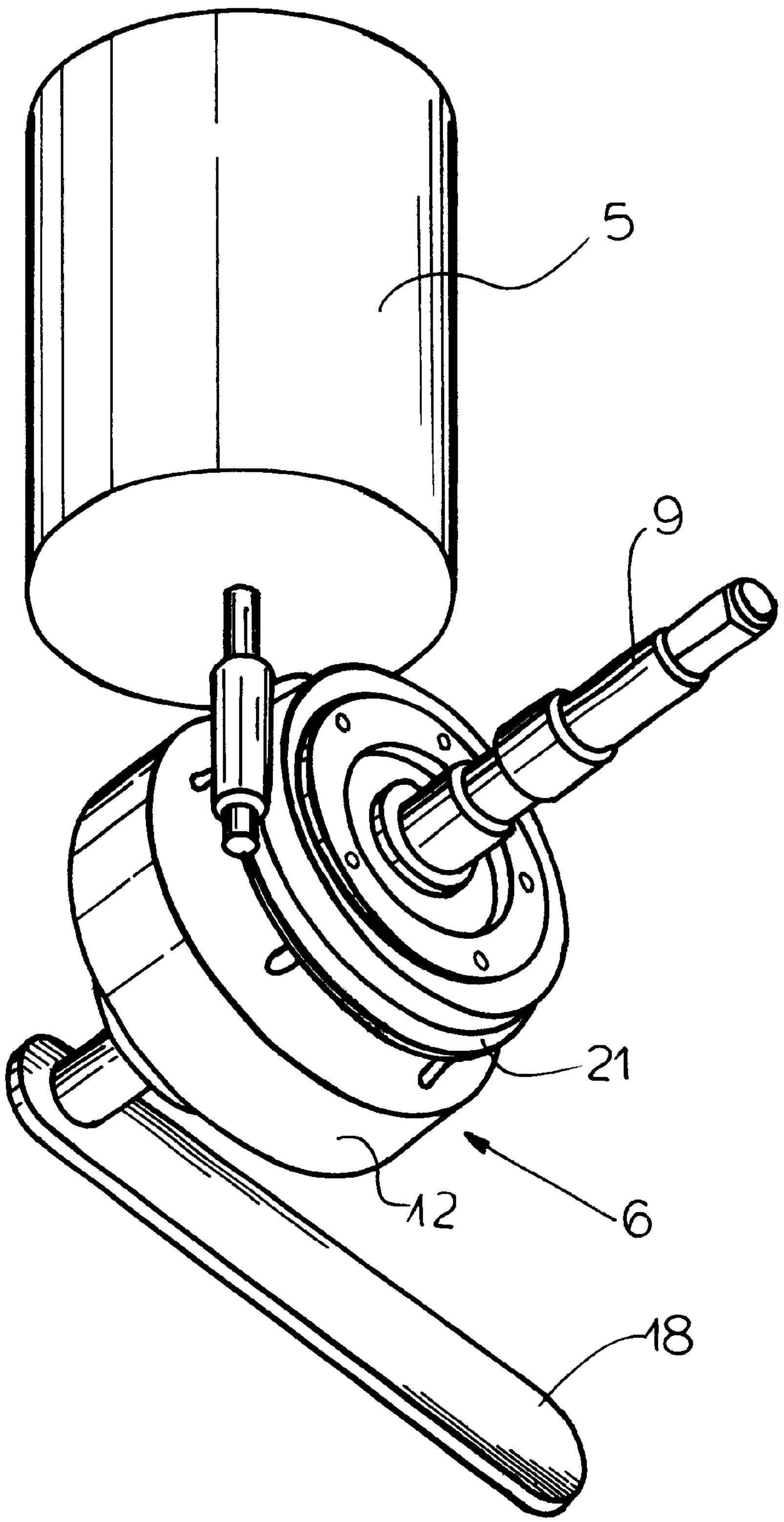
FIG. 6 is a perspective view of the drive unit from below.

A threaded spindle 17 engaged in a nut 19 fixed in the body 10 can engage a pusher body 20 carried on the wheel 11 and carries at its outer end an operating arm or handle 18. This handle 18 can be moved between a pair of 180° offset stops 25 in FIG. 4 to push in the wheel 11 and disengage the surfaces 16 from each other, thereby decoupling the drum 4 from the motor 5. In this uncoupled position the door 1 can be opened or closed manually, even if the motor 5 is frozen or lacks power. This manual override can be used in case of an emergency to open the door from inside when the vehicle's power fails, or can be set in case the motor unit has failed, making the vehicle usable, albeit without a motor-assisted sliding door.

We claim:

1. In a motor vehicle having a body and a door slidable outside the body, a cable drive comprising:

a rotatable shaft projecting through the body and having an outer end outside the vehicle adjacent the door and an inside end inside the vehicle;

a drum outside the vehicle mounted on the outside end;

a cable wholly outside the vehicle, wound around the drum, and connected to the door, whereby rotation of the drum and shaft in one direction slides the door into a closed position and opposite movement slides it into an open position;

a motor unit wholly inside the vehicle connected to the inside shaft end; and a clutch between the motor unit and the shaft openable to uncouple the motor unit from the shaft and closable to connect the motor unit to the shaft, the clutch including an input clutch member directly driven by the motor, rotatable on the shaft, and having a clutch surface, the shaft being centered on and rotatable about a shaft axis;

an output clutch member fixed rotatable on the shaft and having a clutch surface engageable axially with the surface of the input clutch member;

a spring operatively braced between the clutch members and urging the surfaces thereof axially together, whereby when the surfaces are enraged together the shaft is coupled via the clutch members to the motor unit;

a fixed nut adjacent one of the clutch members;

a spindle threaded in the fixed nut and engageable with the one clutch member to push it against the spring out of engagement with the other clutch member; and a manually operable handle on the spindle.

2. The sliding-door cable drive defined in claim 1 wherein the shaft carries a disk and the spring is braced between the disk and the output clutch member.

3. The sliding-door cable drive defined in claim 2 wherein the surfaces are frustoconical and centered on the axis.

4. The sliding-door cable drive defined in claim 1 wherein the handle is a radially projecting arm, the drive further comprising at least one stop defining an end position for the arm.

* * * * *